United States Patent
Carpenter et al.

(10) Patent No.: US 7,464,404 B2
(45) Date of Patent: Dec. 9, 2008

(54) METHOD OF RESPONDING TO A TRUNCATED SECURE SESSION ATTACK

(75) Inventors: Brian Edward Carpenter, Auckland (NZ); Kevin David Himberger, Durham, NC (US); Clark Debs Jeffries, Chapel Hill, NC (US); Mohammad Peyravian, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/283,380

(22) Filed: Nov. 17, 2005

(65) Prior Publication Data
US 2006/0075496 A1    Apr. 6, 2006

Related U.S. Application Data

(63) Continuation-in-part of application No. 10/442,008, filed on May 20, 2003, now Pat. No. 7,308,716.

(51) Int. Cl.
*G06F 9/00* (2006.01)
*G06F 11/00* (2006.01)
*G06F 15/173* (2006.01)
*G06F 15/16* (2006.01)

(52) U.S. Cl. .............. 726/14; 726/23; 726/24; 726/25; 709/224; 709/226; 709/229

(58) Field of Classification Search ............ 726/2, 726/3, 4, 11, 21, 22, 23, 25, 26, 14, 24; 709/224, 709/226, 229
See application file for complete search history.

(56) References Cited

U.S. PATENT DOCUMENTS 5,557,742 A    9/1996    Smaha et al. ............ 395/186

(Continued)

FOREIGN PATENT DOCUMENTS

| JP | 2001057554 | 2/2001 |
|---|---|---|
| JP | 2002252654 | 9/2002 |
| WO | WO0225402 | 3/2002 |

OTHER PUBLICATIONS

Raeth, P. et al. "Finding Events Automatically in Continuously Sampled Data Streams via Anomaly Detection", IEEE National Aerospace and Electronics Conference (NAECON) Oct. 2000, pp. 580-587.

*Primary Examiner*—Emmanuel L Moise
*Assistant Examiner*—Techane J Gergiso
(74) *Attorney, Agent, or Firm*—John R. Pivichny

(57) ABSTRACT

A method of progressive response for invoking and suspending blocking measures that defend against network anomalies such as malicious network traffic so that false positives and false negatives are minimized. When a truncated secure session attack is detected, the detector notifies protective equipment such as a firewall or a router to invoke a blocking measure. The blocking measure is maintained for an initial duration, after which it is suspended while another test for the anomaly is made. If the attack is no longer evident, the method returns to the state of readiness. Otherwise, a loop is executed to re-applying the blocking measure for a specified duration, then suspend the blocking measure and test again for the attack. If the attack is detected, the blocking measure is re-applied, and its duration is adapted. If the attack is no longer detected, the method returns to the state of readiness.

5 Claims, 2 Drawing Sheets

U.S. PATENT DOCUMENTS

| | | | |
|---|---|---|---|
| 5,621,889 A | 4/1997 | Lermuzeaux et al. | 395/186 |
| 5,991,881 A | 11/1999 | Conklin et al. | 713/201 |
| 6,282,546 B1 | 8/2001 | Gleichauf et al. | 707/102 |
| 6,405,318 B1 | 6/2002 | Rowland | 713/200 |
| 6,477,651 B1 | 11/2002 | Teal | 713/200 |
| 6,487,666 B1 | 11/2002 | Shanklin et al. | 713/201 |
| 6,530,024 B1 | 3/2003 | Proctor | 713/201 |
| 6,907,473 B2 * | 6/2005 | Schmidt et al. | 709/248 |
| 7,017,185 B1 * | 3/2006 | Wiley et al. | 726/23 |
| 7,099,320 B1 * | 8/2006 | Salerno | 370/389 |
| 7,159,237 B2 * | 1/2007 | Schneier et al. | 726/3 |
| 7,293,290 B2 * | 11/2007 | Szor | 726/24 |
| 2002/0032871 A1 * | 3/2002 | Malan et al. | 713/201 |
| 2002/0087882 A1 | 7/2002 | Schneier et al. | 713/201 |
| 2002/0101819 A1 | 8/2002 | Goldstone | 370/229 |
| 2003/0043853 A1 | 3/2003 | Doyle et al. | 370/489 |
| 2004/0083385 A1 * | 4/2004 | Ahmed et al. | 713/201 |
| 2004/0123142 A1 * | 6/2004 | Dubal et al. | 713/201 |
| 2004/0199791 A1 * | 10/2004 | Poletto et al. | 713/201 |
| 2004/0250124 A1 * | 12/2004 | Chesla et al. | 713/201 |
| 2005/0210533 A1 * | 9/2005 | Copeland et al. | 726/23 |
| 2006/0041667 A1 * | 2/2006 | Ahn et al. | 709/229 |
| 2006/0117386 A1 * | 6/2006 | Gupta et al. | 726/23 |

* cited by examiner

METHOD OF RESPONDING TO A TRUNCATED SECURE SESSION ATTACK

This application is a continuation-in-part of application Ser. No. 10/442,008 filed May 20, 2003 now U.S. Pat. No. 7,308,716.

FIELD OF THE INVENTION

The present invention is related to the field of networking, and more particularly to the field of protecting network-connected equipment from damage caused by malicious network traffic.

BACKGROUND

Internet-based communication is now frequently subject to electronic vandalism. As the sophistication of measures intended to combat such vandalism grows, new forms of vandalism appear. For example, a worm known as W32.SQLExp.Worm, or more simply as the Slammer Worm, appeared in late January, 2003. The Slammer Worm inflicted damage upon its victims by sending 376-byte packets to UDP port 1434, which is the SQL Server Resolution Server Port, and in effect provided a Denial of Service attack. One highly damaging attribute of the Slammer Worm was its unprecedented rate of growth and propagation, reportedly doubling itself every 8.5 seconds.

Such extreme forms of vandalism exceed the capabilities of known defensive mechanisms, sometimes even turning the defensive mechanisms themselves into Pyrrhic exercises that are accompanied by so many unintended consequences as to make their benefits questionable. For example, to combat the Slammer Worm, all traffic that includes UDP port 1434 in a source or destination address may simply be blocked. Unfortunately, this disrupts any flow of legitimate traffic that happens to include the same identification. Perhaps more troublesome, any appearance of legitimate traffic for UDP 1434 may trigger defensive measures even in the absence of the Slammer Worm.

Instances of invoking defensive measures in the absence of an intended trigger may generally be called false positives. Conversely, failing to recognize an intended trigger, or allowing any substantial delay once a trigger is detected, may permit fact-acting agents of vandalism such as the Slammer Worm to inflict severe damage before being brought under control. Such instances of failing to invoke defensive measures in the presence of an intended trigger may generally be called false negatives.

To combat rapidly propagating agents of vandalism such as the Slammer Worm, there is a need for an improved method of applying measures that defend against malicious traffic, where the improved method has a low rate of false positives, so that legitimate traffic unrelated to vandalism is not blocked, and also has a low rate of false negatives, so that fast-acting agents of vandalism are not allowed to inflict significant damage before they are blocked.

SUMMARY OF THE INVENTION

The present invention includes a method of progressive response that applies and suspends blocking measures for an adaptive duration to defend against a truncated secure session attack, in a way that minimizes the adverse consequences of false positives and false negatives.

Truncating a TCP (transmission control protocol) session before completion of the three-way handshake is a well known attack method with some partially effective mitigating measures. However, attackers may choose to go "above" TCP to partially complete secure information exchange protocols.

The method starts in a state of readiness to act, wherein a detector such as an Intrusion Detection Security System monitors for network anomalies. When an anomaly is detected, the detector notifies protective equipment such as a firewall or a router to apply a blocking measure against traffic that bears the distinguishing marks of malicious traffic. The blocking measure is maintained for an initial duration, after which it is suspended while another test is made to determine whether the anomaly is still evident. If the anomaly is no longer evident, the method returns to the state of readiness.

Otherwise, (i.e., the anomaly is still evident) the duration is adapted and the method begins to execute a loop. The loop includes the steps of re-applying the blocking measure for the duration, suspending the blocking measure at the end of the duration, and testing again for the anomaly while the blocking measure is suspended. Each time that the anomaly is detected during execution of the loop, the duration is again adapted, for example increased in accordance with a monotone non-decreasing function that may be subject to an upper bound which prevents the occurrence of extreme durations. The blocking measure is then re-applied for the newly specified duration. When a test indicates that the anomaly is no longer evident, the duration is again adapted by re-setting it to its initial value, and the method returns to the state of readiness where the blocking measure is not applied.

Thus, with the present invention, the blocking measure is applied quickly once malicious traffic is detected and maintained as long as a threat of malicious traffic is evident, thereby minimizing the adverse consequences of false negatives, and yet also suspended as quickly as possible, once the threat of malicious traffic has passed, thereby minimizing the adverse consequences of false positives, consistent with minimizing unproductive churning and response to mid-attack false negatives. These and other aspects of the present invention will be more fully appreciated when considered in light of the following detailed description and drawings.

In the case of an attack going "above" TCP, ordinary distributed denial of services (DDoS) intrusion detection methods are not effective because the three-way handshake is completed. Accordingly, a new method of quickly detecting this type of malicious traffic is needed in order to effectively apply and subsequently remove blocking measures as described herein.

DETAILED DESCRIPTION

The present invention provides a progressive response that applies and suspends blocking measures to defend against network anomalies such as malicious network traffic, in a way that minimizes the adverse consequences of false positives and false negatives.

Figure 1:
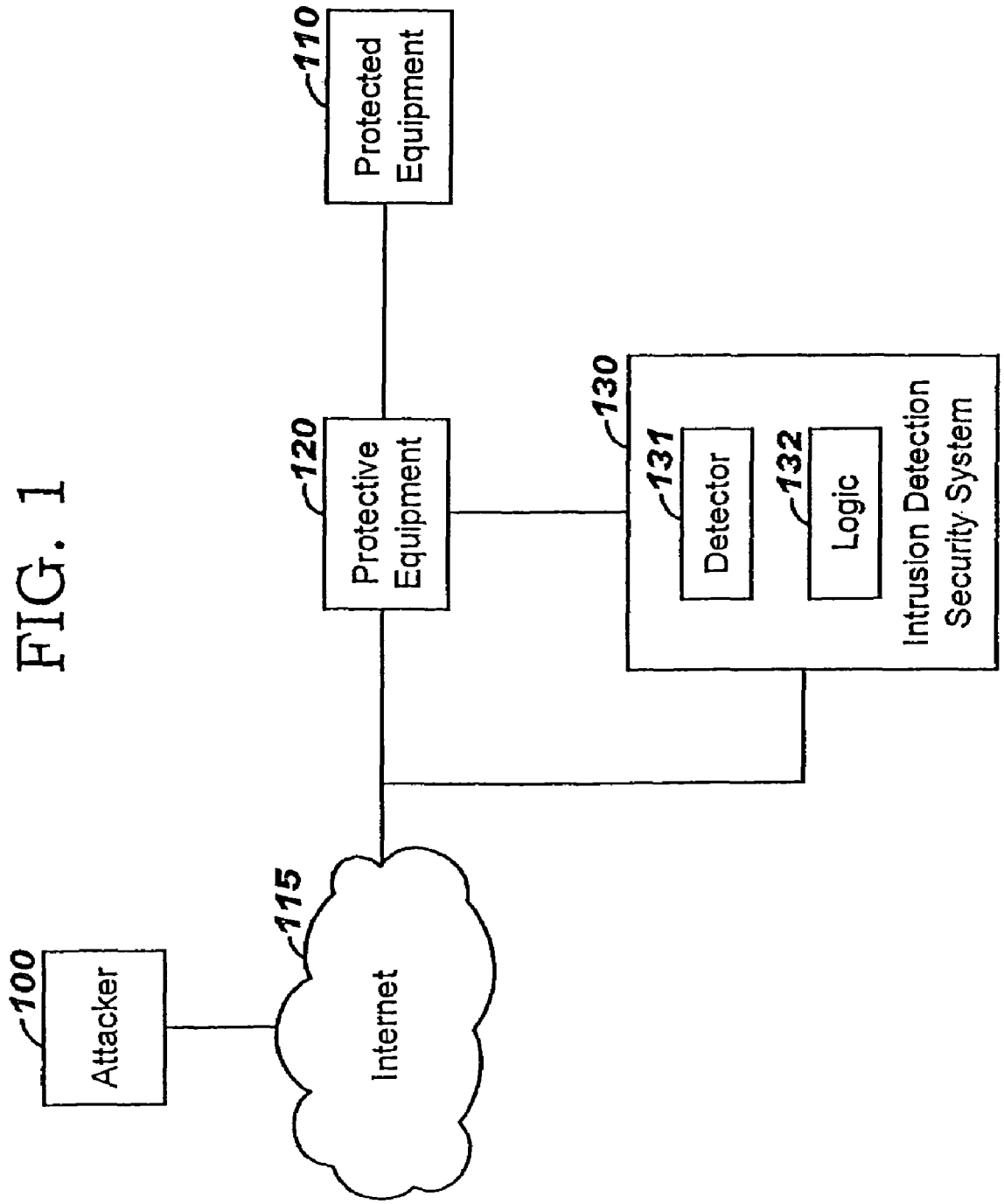
FIG. 1 is a diagram showing an exemplary context suitable for application of the present invention.

As shown in FIG. 1, a vandal or attacker 100 may attempt to inflict damage upon protected equipment 110, for example a web server or a network-connected personal computer, through the Internet 115 or another communication network. In the context of the present invention, such vandalism may include denial of service (DoS) attacks such as bandwidth attacks and connectivity attacks, distributed denial of service (DDoS) attacks, targeted common gateway interface (CGI) attacks, HTTP-based attacks, worms such as the W32.SQLExp.Worm, WWW attacks, reconnaissance activity, and so forth, all of which are generically called "network anomalies" here for descriptive convenience.

As used herein, the term zombie shall mean a computing machine compromised by an attacker. The term Truncated Secure Session Attack (TSS Attack) shall mean an attack using a security protocol over TCP in which a TCP three-way handshake has been completed and a zombie carries out some but not all of subsequent steps to initialize a secure information exchange. For example, some but not all SSL (secure sockets layer) steps in a credit card purchase may be carried out. Because the three-way handshake is completed, the source address (SA) is likely to be that of an actual running computer machine located somewhere.

During a severe TSS attack, thousands of zombies might participate. For example, 100,000 computing machines could be zombies. According to the present invention, such an attack is detected in detector 131 in the following way.

For a four byte ID address space, there are 2^32 possible values. A Direct Table lookup using a 16 bit index is used. Thus, the indices of slots in the table run from 0000 0000 0000 0000 through 1111 1111 1111 1111. The source address of inbound IP (internet protocol) traffic is 32 bits. Of these, the first 16 bits are denoted a 16-bit leader of the full IP address. The 16 bit Direct Table will have a 2^16 or about 64,000 slots identified as the 64,000 16-bit leader values.

Note that 100,000 zombies will most likely have only a relatively few different 16-bit leader values, perhaps several hundred. This represents a small portion of the 64,000 16-bit leader values. The present invention operates by finding and blocking only this small number of 16-bit leader values to mitigate a TSS attack.

A leaf is attached to each table slot. Each leaf just keeps a count for a pre-specified time, D, of the number of inbound packets having that 16-bit leader in its source address. Only packets having a leader value that distinguishes it as the earliest essential step above TCP are counted. The leaf also has a threshold value and sets a threshold bit whenever the count exceeds the threshold value.

The direct table is completely purged every D time units. For example, D may be several tens of seconds.

Prior to a TSS attack, after each D time interval, there is a distribution of observed counts in the direct table. The distribution is not uniform and varies from table slot to slot, with many slots having zero and some having up to 1,000, for a typical D value. The maximum for a particular D will also vary by time of day, season, and the like. However, during normal operation (that is without an ongoing TSS attack), there will be a specific observed maximum over a period of time, such as the last 100 days.

A TSS attack is therefore detected by the presence of high counts and high count increase rates in particular slots. Filters are activated to block all arriving traffic with source addresses having the same 16-bit lender value as the slots having high counts or high count increase rates. An exponentially weighted moving average of counts over past D intervals may be used to distinguish high counts and high count increase rates.

After being applied, the blocking measures may be suspended using the various techniques described elsewhere in this specification.

In a preferred embodiment, an allow list comprising 16-bit leaders that are associated with trusted internet service providers is created. For example, these may be trusted to react by trying to find zombies if called upon. During a TSS attack, a first action may be to block all traffic not in that allow list. Then, if necessary, some 16-bit leaders within the allow list may also be blocked.

The present invention may be applied to longer IP addresses by extending the techniques described above using known art. For example, the second set of 16 bits may be mapped to the direct table index. A hash table may be used with more than 16 bits of address or a bitwise exclusive or operation may be applied to the first 16 address bits and the second 16 address bits to yield the table index value. Those of ordinary skill will immediately recognize other ways of extending the present invention to such longer addresses.

Using methods known to those skilled in the art, a detector 131 detects the presence of network anomalies by observing malicious traffic incoming to, or originating from, the protected equipment 110. Responsive to the output of the detector 131, which output at time t is denoted here as D(t), logic 132 oversees steps of the inventive method for instructing protective equipment 120 to apply, for an adaptively determined duration and then to suspend, blocking measures that guard the protected equipment 110 against network anomalies. These steps are explained in more detail below.

Here, the term "blocking measure" is to be interpreted widely as the enforcement of a defensive rule, and includes, for example, discarding, logging, or rate limiting traffic from a particular source address or set of source addresses; discarding, logging, or rate limiting traffic to a particular destination address or set of destination addresses; discarding, logging, or rate limiting UDP traffic from the Internet 115 to a particular subnet or set of subnets; discarding, logging, or rate limiting UDP traffic from the Internet 115 to a subnet with a particular UDP destination port or set of UDP destination ports; and so forth, including various combinations of the foregoing.

More generally, it is important to note that the structural details shown in FIG. 1 are illustrative rather than limiting. For example, the protective equipment 120 may be part of a router, or of a firewall, or of other suitable equipment. Either or both of the detector 131 or the logic 132 may reside within the protective equipment 120, or within an intrusion detection security system 130 as shown for convenience in FIG. 1, or may reside elsewhere in the structure of FIG. 1. The logic 132 may be dedicated hardware or a dedicated processor such as a microprocessor, or may be provided functionally by instructions executed by a processor that has other purposes as well.

Figure 2:
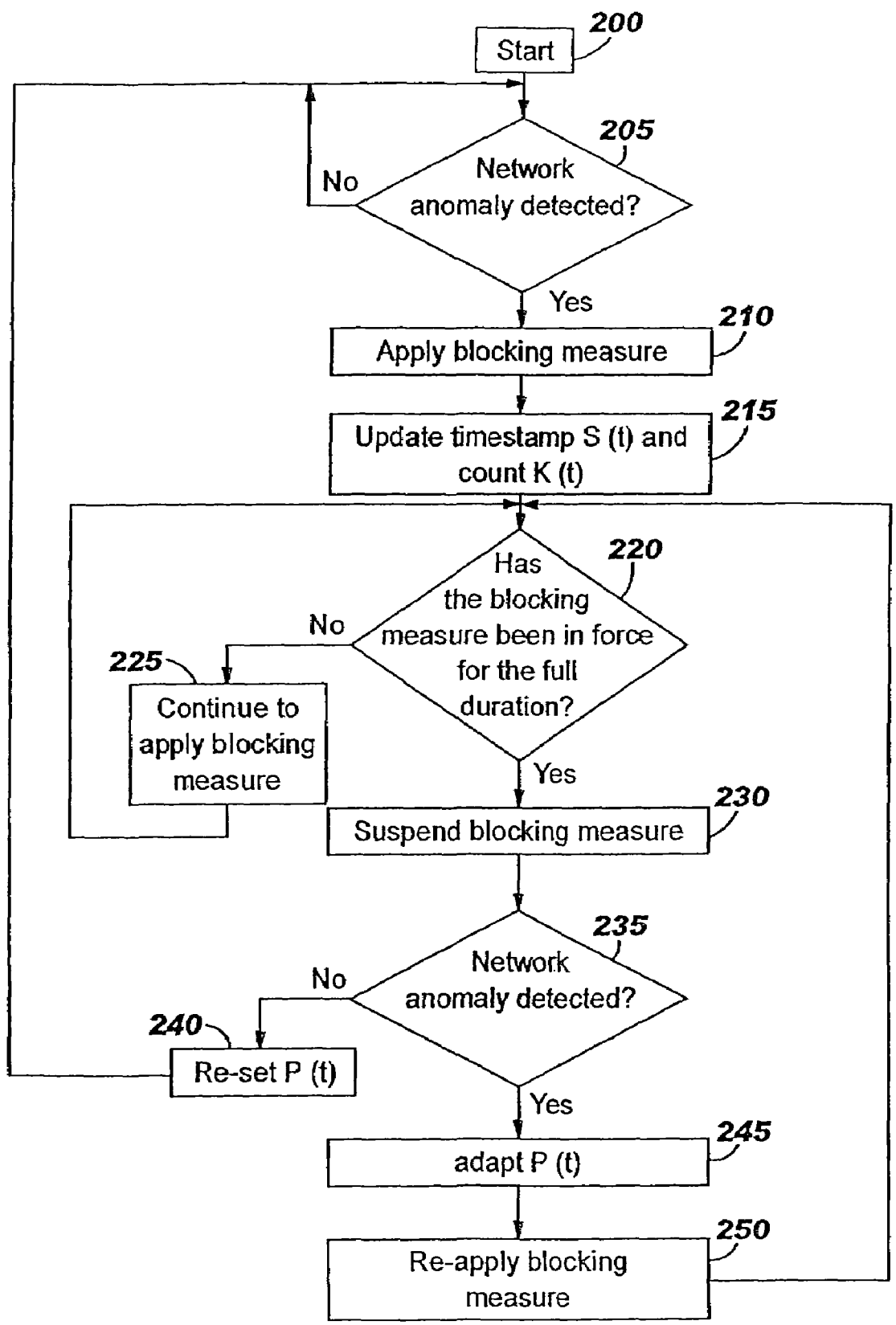
FIG. 2 is a flowchart that shows aspects of the operation of the inventive method in the context of FIG. 1.

As already mentioned, the invention includes methods for responding progressively to the detection of network anomalies by adapting the duration of blocking measures, exemplary aspects of which methods are shown in the flowchart of FIG. 2.

In a preferred embodiment of the inventive method, time is partitioned into intervals of constant length, which is denoted here as Dt. The system is updated at integer multiples of the interval Dt, that is, at the times Dt, 2Dt, 3Dt, and so forth. Let S(t) be a time stamp that indicates the absolute start time of the most recent sequence of time values with consecutive application of a blocking measure. This is an internal variable that is periodically stored, refreshed, and restored with period Dt. Let K(t) be the count of the number of times, within the present epoch of consecutive detections of network anomaly, that the blocking measure has been suspended and then re-applied in response to the detection of a persistent network anomaly. K(t) is re-set to zero when the blocking measure is suspended and the network anomaly is no longer detected. Further, Let P(t) be the duration of the blocking measure, which has an initial value $P_0$, and which is adapted to provide a progressive response, for example adapted according to a function of K(t) as explained below.

As shown in FIG. 2, the method starts (step 200) in a state of readiness, wherein the protective equipment 120 has not yet applied any blocking measures. P(t) is set to its initial value $P_0$, being a positive integer multiple of Dt, and the variables K(t) and S(t) are set to zero. The detector 131 tests for network anomalies (step 205). If no network anomaly is detected, the detector 131 continues to test (step 205). Otherwise (i.e., a network anomaly is detected), the protective equipment 120 is instructed to apply a blocking measure (step 210). The variables S(t) and K(t) are then updated (step 215). The current value of P(t), which at this point is still $P_0$, is compared (step 220) with the time lapsed since the last test for network anomalies to determine whether the blocking measure has been applied (i.e., has been in force) for the full duration. If the blocking measure has not been applied for the full duration P(t), the blocking measure is continued (step 225) while the comparison with P(t) is made again (step 220).

Otherwise (i.e., the blocking measure has been applied for the full duration P(t)), the blocking measure is suspended (step 230). In a preferred embodiment, the blocking measure is suspended for one time interval Dt, although this is not a necessary condition of the invention. The detector 131 tests again to determine whether the network anomaly is still evident (step 235). If the network anomaly is no longer evident, P(t) is reset to its initial value $P_0$ (step 240), and the method returns to the state wherein the detector 131 monitors for network anomalies (step 205).

Otherwise (i.e., an anomaly has been detected at step 235), the value of P(t) is adapted (step 245), the blocking measure is re-applied (step 250), and the method returns to the state wherein the adapted value of P(t) is compared (step 220) with the time lapsed since the last test for network anomalies.

The value of the variable P(t), which represents the duration of the blocking measure, may be adapted, for example by increasing the value according to a monotone non-decreasing function of, for example, K(t), optionally subject to a cap or maximum value or upper bound, which upper bound may be expressed as a function of K(t). In a preferred embodiment, P(t) may be increased according to $P(t)=(M^{(K(t)-1)})*P_0$, where M is a positive real number, and a maximum value of L is imposed on K(t). Preferred embodiments have used the integer values M=2 and M=8, the first of which causes the value of P(t) to double each time it increases. In other embodiments, the value of P(t) may increase in other ways, for example linearly, exponentially as a function of the value of P(t), logarithmically, randomly, asymptotically to a prescribed maximum, according to a table of pre-computed values, and so forth.

The following set of difference equations provides another way of describing aspects of the embodiment of the invention wherein the blocking measure is suspended in step 230 for a length of time Dt while the test for the anomaly is made in step 235. In these equations, let B(t) characterize the state of the blocking measure (a value of one means that the blocking measure is applied, a value of zero means that the measure is suspended). As mentioned above, let D(t) characterize the output of the detector 131 as of its last measurement (a value of one means that an anomaly is evident, a value of zero means that no anomaly is evident). Then:

$$B(t+Dt)=D(t)*(1-B(t))+(1-D(t)*(1-B(t)))*\text{if}(t+Dt-S(t)<P(t), \text{ then } 1, \text{ else } 0),$$

$$S(t+Dt)=B(t+Dt)*(1-B(t))*(t+Dt-S(t))+S(t), \text{ and}$$

$$K(t+Dt)=\min\{L, D(t)*(K(t)+B(t+Dt)*(1-B(t))+(1-D(t))*B(t+Dt)*(K(t)+1-B(t))\}.$$

Also note that B(t+Dt) characterizes the decision to apply the blocking measure during the time interval t,t+Dt, whereas D(t) characterizes the output of the detector 131 during the interval of time t−Dt, t.

A preferred embodiment of the invention, described above, uses time to characterize and adapt the duration of the blocking measure. Another embodiment of the invention uses a count of traffic, such as a count of packets, bits, or frames, rather than time, to characterize and adapt the duration. In such embodiments, the blocking measure is applied until, for example, the requisite number X of packets is seen by the detector 131 or otherwise sensed. In a preferred embodiment, X has the value X=1000. These kinds of embodiments may be preferred to the aforementioned time-characterized embodiments when the bandwidth of the data stream incoming to the protected equipment 110 is highly variable.

In the embodiments of the invention described so far, the inventive method is responsive to the detection of anomalies. The invention also encompasses other embodiments wherein the method responds to penetrations rather than to detections. Here, a penetration is a time step in which malicious traffic arrives when no appropriate blocking measure is active. Such embodiments may be described by a similar set of difference equations as follows.

Over the time interval t−Dt,t, an attack might or might not occur. If an attack occurs, then denote its presence at time t by A(t)=1 and hold that value for the interval t,t+Dt. If an attack does not occur, the value of A(t) is A(t)=0 over the same interval. If a blocking measure is applied over the interval t,t+Dt, then B(t)=1; otherwise B(t)=0. Define penetration N(t) =A(t)*(1−B(t)). A timestamp S(t) and the count K(t) are updated. The blocking measure is applied (held on) for the duration P(t). Then:

$$B(t+Dt)=N(t)*(1-B(t))+(1-N(t))*(1-B(t)))*\text{if}(t+Dt-S(t)<(M^{(K(t)-1)})*P_0 \text{ then } 1, \text{ else } 0),$$

$$S(t+Dt)=B(t+Dt)*(1-B(t))*(t+Dt-S(t))+S(t), \text{ and}$$

$$K(t)=\min\{L, N(t)*(K(t)+1)+(1-N(t))*B(t)*K(t)\}.$$

From the foregoing description, those skilled in the art will appreciate that the present invention provides a progressive response that applies and suspends blocking measures to defend against network anomalies such as malicious network traffic, in a way that minimizes the adverse consequences of false positives and false negatives. The foregoing description is illustrative rather than limiting, however, and the scope of the present invention is limited only by the following claims.

We claim:

1. A method of responding to a truncated secure session attack, comprising the steps of:
    forming a direct table having a plurality of slots associated with leader values of internet protocol addresses, each slot having a leaf to keep a count of packets in a pre-specified time interval;
    receiving an inbound packet having a header value that distinguishes it as the earliest essential step above transmission control protocol, and an internet protocol address;
    incrementing the count in the slot associated with the internet protocol address;
    determining at the end of the pre-specified time interval whether a subset of the slots have a high count or high count increase over previous time intervals;
    applying a blocking measure for internet protocol addresses associated with the subset of slots for a duration that is determined adaptively;

suspending the blocking measure at the end of the duration; and wherein the duration is determined adaptively in response to a count of a number of times that the blocking measure has been applied, an interval of time and a count of traffic.

2. The method of claim 1, wherein the duration is adapted according to a monotone non-decreasing function of the count.

3. A method of responding to a truncated secure session attack, comprising the steps of:

forming a direct table having a plurality of slots associated with leader values of internet protocol addresses, each slot having a leaf to keep a count of packets in a pre-specified time interval;

providing an allow list of leader values of trusted providers;

receiving an inbound packet having a header value that distinguishes it as the earliest essential step above transmission control protocol, and an internet protocol address;

incrementing the count in the slot associated with the internet protocol address;

determining at the end of the pre-specified time interval whether a subset of the slots have a high count or high count increase over previous time intervals;

applying a blocking measure for internet protocol addresses associated with the subset of slots which are not on the allow list, for a duration that is determined adaptively;

suspending the blocking measure at the end of the duration; and wherein the duration is determined adaptively in response to a count of a number of times that the blocking measure has been applied, an interval of time and a count of traffic.

4. A method of responding to a truncated secure session attack, comprising the steps of:

forming a direct table having a plurality of slots associated with leader values of internet protocol addresses, each slot having a leaf to keep a count of packets in a pre-specified time interval;

receiving an inbound packet having a header value that distinguishes it as the earliest essential step above transmission control protocol, and an internet protocol address;

incrementing the count in the slot associated with the internet protocol address;

determining at the end of the pre-specified time interval whether a subset of the slots have a high count or high count increase over previous time intervals;

applying a blocking measure for internet protocol addresses associated with the subset of slots for a duration that is determined adaptively;

suspending the blocking measure at the end of the duration and re-testing for the presence of the high count or high count increase;

adapting the duration and re-applying the blocking measure for the adapted duration; and wherein the duration is determined adaptively in response to a count of a number of times that the blocking measure has been applied, an interval of time and a count of traffic.

5. The method of claim 4, wherein the duration is adapted according to a monotone non-decreasing function of the count.

* * * * *